United States Patent [19]

Isozaki

[11] Patent Number: 5,418,297

[45] Date of Patent: May 23, 1995

[54] CROSSLINKING AGENT AND CURABLE COMPOSITION

[75] Inventor: Osamu Isozaki, Yokohama, Japan

[73] Assignee: Kansai Paint Company, Limited, Amagasaki, Japan

[21] Appl. No.: 27,152

[22] PCT Filed: Nov. 26, 1992

[86] PCT No.: PCT/JP92/01543
§ 371 Date: Mar. 18, 1993
§ 102(e) Date: Mar. 18, 1993

[87] PCT Pub. No.: WO93/11188
PCT Pub. Date: Jun. 10, 1993

[30] Foreign Application Priority Data

Nov. 26, 1991 [JP] Japan .................. 3-310361
Dec. 11, 1991 [JP] Japan .................. 3-327652
Jun. 25, 1992 [JP] Japan .................. 4-167702
Jun. 25, 1992 [JP] Japan .................. 4-167703

[51] Int. Cl.$^6$ .............................. C08G 59/42
[52] U.S. Cl. .................... 525/386; 523/427; 525/327.3; 525/328.8; 525/329.2; 525/523; 525/533
[58] Field of Search ........... 525/386, 327.3, 328.8

[56] References Cited

U.S. PATENT DOCUMENTS

| | | | |
|---|---|---|---|
| 3,914,333 | 10/1975 | Labana | 525/208 |
| 3,976,716 | 8/1976 | Labana | 525/207 |
| 3,976,717 | 8/1976 | Labana | 525/207 |
| 3,998,905 | 12/1976 | Labana | 523/437 |
| 4,069,275 | 1/1978 | Labana | 525/208 |
| 4,861,841 | 8/1989 | Marrion | 525/327.3 |
| 4,868,265 | 9/1989 | Gupta | 528/26 |
| 5,179,189 | 1/1993 | Domb et al. | |

FOREIGN PATENT DOCUMENTS 2590262 5/1987 France .
1415013 11/1975 United Kingdom .
1429758 3/1976 United Kingdom .
1438430 6/1976 United Kingdom .

OTHER PUBLICATIONS

Lee et al. "Handbook Of Epoxy Resins", 12-2-12-4, (1967) McGraw-Hill (New York).

*Primary Examiner*—Fred Zitomer
*Attorney, Agent, or Firm*—Armstrong, Westerman, Hattori, McLeland & Naughton

[57] ABSTRACT

The invention provides a crosslinking agent comprising a compound having at least two noncyclic acid anhydride groups and represented by the following formula

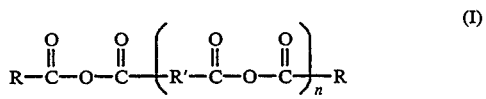

wherein R is a monovalent hydrocarbon group having 2 to 50 carbon atoms, R' is a bivalent hydrocarbon group having 2 to 50 carbon atoms, the hydrocarbon groups R and R' containing or not containing an ether linkage, urethane linkage or ester linkage, and n is an integer of 1 to 500.

The invention also provides a curable composition including (A) at least one resin selected from the group consisting of (i) a resin having at least one epoxy group and at least one hydroxyl group in the molecule, (ii) a resin mixture of a resin having at least two epoxy groups in the molecule and a resin having at least two hydroxyl groups in the molecule, and (iii) a resin having at least two epoxy groups in the molecule, and (B) the above-mentioned crosslinking agent.

11 Claims, No Drawings

CROSSLINKING AGENT AND CURABLE COMPOSITION

TECHNICAL FIELD

The present invention relates to novel crosslinking agents and novel curable compositions having the agent incorporated therein.

BACKGROUND ART

Powder coating compositions are already known which are curable on crosslinking and which comprise an epoxy-containing resin and a compound or resin having a cyclic acid anhydride group and a free carboxyl group. These compositions have actually useful properties. However, when the powder composition is made into a coating composition of the organic solvent type, the resulting composition is low in storage stability and further has the drawback that it is difficult for the liquid composition to have a high solids content. Also known are coating compositions of the organic solvent type which comprise a resin containing both epoxy and hydroxyl, and a cyclic acid anhydride, such as succinic anhydride or methylhexahydrophthalic anhydride, for curing the resin by crosslinking, whereas the acid anhydride has the drawback of being susceptible to hydrolysis, for example, owing to the presence of water in the pigment, diluting solvent, air, etc. and therefore impairing the storage stability and curability of the composition.

DISCLOSURE OF THE INVENTION

An object of the present invention is to provide a novel crosslinking agent which is useful for curing epoxy-containing resins, epoxy- and hydroxyl-containing resins and like resins by crosslinking.

Another object of the invention is to provide a novel curable composition having the crosslinking agent incorporated therein and free of the foregoing drawbacks of the prior art.

These and other objects of the present invention will become apparent from the following description.

The present invention provides a crosslinking agent which comprises a compound having at least two noncyclic acid anhydride groups and represented by the following formula

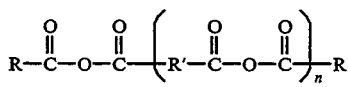
(I)

wherein R is a monovalent hydrocarbon group having 2 to 50 carbon atoms, R' is a bivalent hydrocarbon group having 2 to 50 carbon atoms, the hydrocarbon groups R and R' containing or not containing an ether linkage, urethane linkage or ester linkage, and n is an integer of 1 to 500.

The present invention further provides a curable composition comprising:

(A) at least one resin selected from the group consisting of (i) a resin having at least one epoxy group and at least one hydroxyl group in the molecule, (ii) a resin mixture of a resin having at least two epoxy groups in the molecule and a resin having at least two hydroxyl groups in the molecule, and (iii) a resin having at least two epoxy groups in the molecule, and (B) the above-mentioned crosslinking agent.

We have Conducted intensive research to overcome the foregoing drawbacks of the prior art and found the following facts.

(1) The compound represented by the formula (I) is suitable as a crosslinking agent for curing epoxy-containing resins and epoxy- and hydroxyl-containing resins by crosslinking.

(2) When the crosslinking agent of the formula (I) is admixed with an epoxy-containing resin or epoxy- and hydroxyl-containing resin, a composition is obtained which is curable by crosslinking through an addition reaction between the epoxy group and the noncyclic acid anhydride group in the compound, or through an addition reaction between the hydroxyl group and the noncyclic acid anhydride group and an addition reaction between a carboxyl group produced by the cleavage of the acid anhydride group and the epoxy group.

(3) Since the crosslinking agent does not contain any free carboxyl group which is a polar group, the above composition is low in viscosity. Coating compositions of high solids content are therefore available with ease.

(4) The crosslinking agent, which is not a cyclic acid anhydride but a noncyclic acid anhydride, is less likely to hydrolyze. Accordingly, the agent is not susceptible to hydrolysis even if water is present in solvents, pigments, etc. which will be used conjointly with the agent. Thus, the agent is unlikely to impair the storage stability or crosslinking curability.

(5) The crosslinking agent permits the composition to form cured coatings of improved scratch resistance.

(6) High storage stability is available also because the crosslinking agent has no or almost no free carboxyl group.

The present invention has been accomplished based on these novel findings.

Next, a detailed description will be given of the resin component of the curable composition of the invention, i.e., the component (A), and the crosslinking agent of the invention, i.e., the component (B), to be admixed with the component (A).

The component (A) of the curable composition of the present invention is at least one resin selected from the group consisting of (i) a resin having at least one epoxy group and at least one hydroxyl group in the molecule, (ii) a resin mixture of a resin having at least two epoxy groups in the molecule and a resin having at least two hydroxyl groups in the molecule, and (iii) a resin having at least two epoxy groups in the molecule.

Preferred examples of resins (i) having at least one epoxy group and at least one hydroxyl group in the molecule are those having at least one epoxy group and at least one hydroxyl group attached to the end and/or side chain of the skeleton of a base resin such as a polyester resin, acrylic resin, polyurethane resin or epoxy resin. These examples include hydroxyl-containing bisphenol-type epoxy resins; acrylic resins consisting essentially of a glycidyl-containing vinyl monomer (such as glycidyl acrylate, glycidyl methacrylate, 3,4-epoxycyclohexylmethyl acrylate or 3,4-epoxycyclohexylmethyl methacrylate) and a hydroxyl-containing vinyl monomer (such as hydroxyethyl acrylate, hydroxyethyl methacrylate, hydroxypropyl acrylate or hydroxypropyl methacrylate), and when required, further containing a vinyl monomer copolymerizable with these monomers; resins obtained by the addition of a compound having hydroxyl and glycidyl (such as glycidol) and a compound having two hydroxyl groups (such as ethylene glycol or diethylene glycol) to a polyurethane resin having free isocyanate by urethanization; etc.

It is required that the resin (i) have at least one epoxy group and at least one hydroxyl group in the molecule, the number of these groups being preferably 2 to 50. An amino, amido or like functional group may be present conjointly with these groups. The resin (A) is preferably about 300 to about 100000, more preferably about 5000 to about 50000, in number average molecular weight (as determined by GPC).

The resin mixture (ii) is composed of a resin (ii-1) having at least two epoxy groups in the molecule and a resin (ii-2) having at least two hydroxyl groups in the molecule. These component resins are as follows.

Stated more specifically, the resin (ii-1) having at least two epoxy groups in the molecule is a resin having at least two epoxy groups attached to the end and/or side chain of the skeleton of a base resin such as epoxy resin, polyester resin, acrylic resin or polyurethane resin. The resin is free from hydroxyl. Examples of such resins are bisphenol-type or novolak-type epoxy resins; acrylic resins consisting essentially of a glycidyl-containing vinyl monomer (such as glycidyl acrylate, glycidyl methacrylate, 3, 4epoxycyclohexylmethyl acrylate or 3,4-epoxycyclohexylmethyl methacrylate), and when required, further containing a vinyl monomer copolymerizable with the monomer; resins prepared by the addition of a compound having hydroxyl and glycidyl, such as glycidol, to a polyurethane resin having free isocyanate by urethanization; and phenoxy resins.

Although it is required that the resin (ii-1) have at least two, preferably 2 to 50, epoxy groups in the molecule, the resin may contain a functional group, such as amino or amido, conjointly with the epoxy groups. The component (ii-1) is preferably about 300 to about 100000, more preferably about 5000 to about 50000, in number average molecular weight (as determined by GPC).

Specifically stated, the resin (ii-2) having at least two hydroxyl groups in the molecule is a resin which has at least two hydroxyl groups attached to the end and/or side chain of the skeleton of a base resin such as polyester resin, acrylic resin, polyurethane resin or epoxy resin, and which is free from epoxy. Examples of useful resins (ii-2) are hydroxyl-containing acrylic resins consisting essentially of a hydroxyl-containing vinyl monomer (such as hydroxyethyl acrylate, hydroxyethyl methacrylate, hydroxypropyl acrylate or hydroxypropyl methacrylate), and when required, further containing a vinyl monomer copolymerizable with the monomer; resins prepared by the addition of a compound having two hydroxyl groups (such as ethylene glycol or diethylene glycol) to a polyurethane resin having free isocyanate by urethanization; polyoxyalkylene glycols or polyols; etc.

Although it is required that the resin (ii-2) have at least two, preferably 2 to 50, hydroxyl groups in the molecule, the resin may further have a functional group, such as amino or amido, conjointly with the hydroxyl groups. The component (ii-2) is preferably about 300 to about 100000, more preferably about 5000 to about 50000, in number average molecular weight (as determined by GPC).

The proportions of the resin (ii-1) and the resin (ii-2) are not limited specifically but can be determined as desired according to the purpose. Preferably about 10 to about 90 wt. %, more preferably 30 to 70 wt. %, of the resin (ii-1) is usually mixed with about 90 to about 10 wt. %, more preferably 70 to 30 wt. of the resin (ii-2) based on the combined weight of the two components.

The resin (iii) having at least two epoxy groups in the molecule is the same as the resin (ii-1).

The crosslinking agent of the invention, i.e., the component (B), to be admixed with the component (A) for use in the curable composition of the invention is a compound having at least two noncyclic acid anhydride group and represented by the following formula

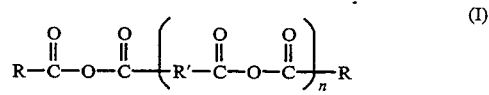

wherein R, R' and n are as defined above.

Resins can be crosslinked and cured utilizing the noncyclic acid anhydride groups in the crosslinking agents of the invention. Usable as such resins are those already known and having a functional group (e.g., hydroxyl or epoxy) which is reactive with the acid anhydride group (or carboxyl). These resins include polyester resins, acrylic resins, epoxy resins, polyurethane resins, silicone resins, fluorine-containing resins and such resins as modified (e.g., polyester-modified acrylic resins, silicon-modified acrylic resins and silicon-modified polyester resins).

The above compound can be prepared easily, for example, by reacting a monocarboxylic acid having one carboxyl group in the molecule with a dicarboxylic acid having two carboxy groups in the molecule for dehydration.

Examples of useful monocarboxylic acids are benzoic acid, methylbenzoic acid, p-tert-butylbenzoic acid and like aromatic monocarboxylic acids; formic acid, acetic acid, propionic acid, butyric acid, caproic acid, caprylic acid, pelargonic acid, isononanoic acid, capric acid, undecanoic acid, lauric acid, myristic acid, palmitic acid, stearic acid, cyclohexanecarboxylic acid, 9-decenoic acid, oleic acid, eleostearic acid, elaidic acid, brassidic acid, linoleic acid, linolenic acid and like saturated or unsaturated aliphatic monocarboxylic acids or alicyclic monocarboxylic acids; etc. Also usable as monocarboxylic acids are coconut oil fatty acid, soybean oil fatty acid, castor oil fatty acid, dehydrated castor oil fatty acid, linseed oil fatty acid, safflower oil fatty acid and the like. These examples are usable singly, or at least two of them can be used in combination.

Examples of useful dicarboxylic acids are terephthalic acid, isophthalic acid, phthalic acid, naphthalenedicarboxylic acid, 4,4'-biphenyldicarboxylic acid, diphenylmethane-4,4'-dicarboxylic acid and like aromatic dicarboxylic acids; hexahydroisophthalic acid, hexahydroterephthalic acid, hexahydrophthalic acid and like alicyclic dicarboxylic acids; adipic acid, sebacic acid, suberic acid, succinic acid, glutaric acid, maleic acid, chloromaleic acid, fumaric acid, dodecanoic diacid, pimelic acid, azelaic acid, itaconic acid, citraconic acid, dimer acid and like aliphatic dicarboxylic acids; etc. One of these acids is usable, or at least two of them can be used in combination.

Among these dicarboxylic acids, those wherein the carboxylic groups are attached to adjacent carbon atoms readily undergo a self-cyclization reaction and encounter difficult in giving the desired crosslinking agent, so that it is desirable not to use them singly. Such dicarboxylic acids are phthalic acid, hexahydrophthalic acid, tetrahydrophthalic acid, succinic acid, maleic acid, chloromaleic acid, etc.

The dehydration reaction between the two components can be conducted at about 80° to about 200° C. To promote this reaction, it is desirable to use a dehydrating agent such as acetic anhydride, acetic acid chloride or phosphorus pentoxide. Although not limited specifically, the amount of the agent to be used is preferably about 2 5o about 200 parts by weight per 100 parts by weight of the combined amount of the two components calculated as solids. The reaction ratio of the two components is variable within a range permitting no free carboxyl group to remain in the product as represented by the formula (I). Stated specifically, it is desirable to use about 0.5 to about 250 moles of the dicarboxylic acid per mole of the monocarboxylic acid.

Further some or all of the carboxylic groups of the two components may be converted, for example, to an acid chloride, alkali metal salt or amine salt (primary, secondary, tertiary or quaternary), followed by a desalting reaction to form acid anhydride groups.

With reference to the formula (I), R and R' are each a hydrocarbon group which has 2 to 50 carbon atoms and which may contain an ether linkage, urethane linkage or ester linkage. The hydrocarbon group is introduced into the compound (I) by using the monocarboxylic acid and dicarboxylic acid.

An ether linkage is introduced into R', for example, by converting the hydroxyl groups at the respective ends of a dihydric alcohol as (poly)etherified to carboxyl groups as by oxidation to obtain a dicarboxylic acid polyether having one carboxyl group at each end, and substituting the polyether for a portion or the whole of the dicarboxylic acid or a modified product thereof. On the other hand, an ether linkage is introduced into R, for example, by converting only one hydroxyl group of the (poly)etherified dihydric alcohol to a carboxyl group, with a monohydric alcohol etherified with the other hydroxyl group, to obtain a monocarboxylic acid containing an ether linkage, substituting this acid for a portion or the whole of the monocarboxylic acid to be used and conducting the same reaction as described above. The presence of the ether linkage results in the advantage that the product obtained on curing can be given high resistance to chemicals.

The dihydric alcohol to be (poly)etherified is a compound having two hydroxyl groups in the molecule. Examples of such alcohols are ethylene glycol, propylene glycol, diethylene glycol, trimethylene glycol, tetraethylene glycol, trimethylene glycol, dipropylene glycol, 1,4-butanediol, 1,3-butanediol, 2,3-butanediol , 1,2-butanediol, 3-methyl-1,2-butanediol, 1,2-pentanediol, 1,5-pentanediol, 1,4-pentanediol, 2,4-pentanediol, 2,3-dimethyltrimethylene glycol, tetramethylene glycol, 3-methyl-4,3-pentanediol, 3-methyl-4,5-pentanediol, 2,2,4-trimethyl-1,3-pentanediol, 1,6-hexanediol, 1,5-hexanediol, 1,4-hexanediol, 2,5-hexanediol, 1,4-cyclohexanedimethanol, neopentyl glycol, bisphenol A, etc. One of these alcohols is usable, or at least two of them can be used in combination.

The polyetherified product can be obtained by subjecting the dihydric alcohol and an alkylene oxide, such as ethylene oxide, propylene oxide or butylene oxide, to an addition reaction.

The monohydric alcohol to be used for forming the group R containing an ether linkage is a compound having one hydroxyl group in the molecule. Examples of such compounds are methyl alcohol, ethyl alcohol, propyl alcohol, butyl alcohol, ethyl butanol, benzyl alcohol, lauryl alcohol, stearyl alcohol, ethylene glycol monomethyl ether, ethylene glycol monoethyl ether, diethylene glycol monomethyl ether, diethylene glycol monoethyl ether, diethylene glycol monobutyl ether and the like. These compounds are usable singly, or at least two of them can be used in combination.

To introduce a urethane linkage into the group R or R' of the formula (I), a polyurethane having an isocyanate group at each of opposite ends is used which is obtained by subjecting a diisocyanate compound and a dihydric alcohol to a urethanization reaction. More specifically, a urethane linkage can be introduced into the group R' by reacting a compound having both hydroxyl and carboxyl in the molecule with the two isocyanate groups of the polyurethane for urethanization to introduce a carboxyl group into each end, and substituting the resulting compound for a portion or the whole of the dicarboxylic acid. Further a urethane linkage can be introduced into the group R by adding a monohydric alcohol to one of the isocyanate groups of the polyurethane, adding a compound having both hydroxyl and carboxyl in the molecule to the other isocyanate group by a urethanization reaction to obtain a monocarboxylic acid, and substituting the acid for a portion or the whole of the monocarboxylic acid stated previously. The presence of the urethane linkage results in the advantage that the product obtained on curing has high hardness, elasticity and high resistance to water and to chemicals.

The diisocyanate compound mentioned above is a compound having two isocyanate groups in the molecule. Exemplary of such compounds are hexamethylene diisocyanate, trimethylhexamethylene diisocyanate and like aliphatic compounds, hydrogenated xylylene diisocyanate, isophorone diisocyanate, cyclohexane diisocyanate and like alicyclic compounds, tolylene diisocyanate, diphenylmethane diisocyanate and like aromatic compounds. Examples of compounds having both hydroxyl and carboxyl are lactic acid, p-hydroxybenzoic acid, dimethylolpropionic acid, hydroxypivalic acid, ricinoleic acid, 12-hydroxystearic acid, etc. Examples of dihydric alcohols and monohydric alcohols usable are those already mentioned.

An ester linkage can be readily introduced into the group R or R' of the formula (I), for example, by subjecting a monocarboxylic acid having one carboxylic group in the molecule and a low-molecular-weight polyester having two carboxyl groups in the molecule to a dehydration reaction. The presence of an ester linkage entails the advantage of giving a noncrystalline compound which is highly compatible with other resins, permitting the resulting composition to form cured coatings of remarkably improved flexibility and elongation.

Examples of monocarboxylic acids useful for the reaction are aliphatic monocarboxylic acids, alicyclic monocarboxylic acids, coconut oil fatty acid, etc. previously mentioned. Also usable are adducts of a monohydric alcohol with a cyclic acid anhydride. Among these, benzoic acid, isononanoic acid, coconut oil fatty acid and the like are desirable to use.

The low-molecular-weight polyester (up to about 2000, preferably 150 to 1000, in number average molecular weight) having two carboxyl groups in the molecule can be easily prepared, for example, from a dicarboxylic acid and a glycol. Preferred polyesters are those invariably having carboxyl groups and an ester linkage in the molecule and free from other functional groups and linkages.

The dicarboxylic acid to be used in this case is a compound having two carboxyl groups in the molecule or an acid anhydride thereof. Examples of such acids include those previously mentioned, i.e., aromatic dicarboxylic acids or acid anhydrides thereof; alicyclic dicarboxylic acids or acid anhydrides thereof; and aliphatic dicarboxylic acids or acid anhydrides thereof. Among these, preferable to use is one selected from among phthalic anhydride, adipic acid, succinic acid, sebacic acid, etc.

The glycol to be used in this case is a compound having two hydroxyl groups in the molecule. Examples of such compounds are the dihydric alcohols previously mentioned. Among these, preferable to use is one selected from among neopentyl glycol, 1,6-hexanediol, 1,4-butanediol, etc.

The esterification reaction between the dicarboxylic acid and the glycol can be carried out by a known process. The reaction ratio of the two components is variable within such a range that the resulting polyester has two carboxyl groups in total at the respective ends or side chains. More specifically, it is suitable to use about 1.2 to about 2 moles of dicarboxylic acid per mole of glycol.

Instead of using the dicarboxylic acid and the glycol for preparing the low-molecular-weight polyester, it is also possible to use a lactone, such as $\epsilon$-caprolactone, and the above-mentioned compound having both hydroxyl and carboxyl.

The component (B) of the formula (I) wherein an ester linkage is introduced into R or R' is prepared by subjecting the monocarboxylic acid stated above and the polyester having two carboxyl groups in the molecule to a dehydration reaction. This dehydration reaction can be conducted at about 80° to about 300° C. To promote this reaction, it is desirable to use a dehydrating agent such as acetic anhydride, acetic acid chloride or phosphorus pentoxide. The amount of the agent to be used, although not limited specifically, is preferably about 2 to about 200 parts by weight per 100 parts by weight of the combined amount of the two components calculated as solids. The reaction ratio between the two components is in such a range that no free carboxyl group remains in the resulting product as shown in the formula (I). More specifically, it is desired to use about 0.5 to about 250 moles of the polyester having two carboxyl groups per mole of the monocarboxylic acid. Also in this case, some or all of the carboxyl groups of the two components may be converted, for example, to an acid chloride, alkali metal salt or amine salt (primary, secondary, tertiary or quaternary), followed by a desalting reaction to prepare acid anhydride groups.

The crosslinking agent of the invention, i.e., the component (B), has noncyclic acid anhydride groups and a number average molecular weight which is preferably about 100 to about 50000, more preferably in the range of 500 to 10000, although not limited specifically. The number of acid anhydride groups in the molecule is at least two, more preferably about 2 to about 50, to be suitable.

The curable composition of the present invention consists primarily of the resin (A) and the crosslinking agent (B). Although the ratio of the component (B) to the component (A) can be determined as desired according to the contemplated purpose, it is preferable to use about 1 to about 1000 parts by weight, more preferably 10 to 200 parts by weight, of the component (B) per 100 parts by weight of the component (A).

The curable composition of the invention, which consists primarily of the component (A) and the component (B), is prepared usually in the form of a liquid by dissolving or dispersing these components in a common organic solvent, and can be used as a coating composition (for motor vehicle outer panels, precoated metals, etc.), adhesive composition, molding material, tackifier, etc. When required, coloring pigments, extender pigments, metallic pigments, ultraviolet absorbers, photostabilizers, various additives for coating compositions, etc. can be admixed with the composition.

The curable composition of the present invention is suitably cured on crosslinking by being heated, for example, to at least 100° C.

Curing reaction catalysts already known can be used in the composition of the invention to effect a promoted reaction between the functional groups in the component (A) and the component (B) (e.g, epoxy groups/hydroxyl groups, acid anhydride groups/epoxy groups, acid anhydride groups/hydroxyl groups/epoxy groups, etc.). Examples of such catalysts include triethylamine, tripropylamine, tributylamine and like tertiary amines; amine salts of organic acids; sodium hydroxide and like alkali metal hydroxides; alkali metal salts of organic acids; calcium hydroxide and like alkaline earth metal hydroxides; alkaline earth metal salts of organic acids; tetramethylammonium, tetraethylammonium, tetrapropylammonium, tetrabutylammonium, dimethyldiethylammonium and like quaternary ammoniums and quaternary ammonium salts thereof with chlorine, bromine or the like; benzyltriphenylphosphonium chloride, tetraphenylphosphonium bromide, ethyltriphenylphosphonium bromide, ethyltriphenylphosphonium iodide, tetrabutylphosphonium chloride, tetrabutylphosphonium bromide and like quaternary phosphonium salts; esters of a sulfonic acid, such as benzenesulfonic acid or dodecylbenzenesulfonic acid, and an alcohol, such as propanol or butanol; esters of such a sulfonic acid and an epoxy-containing compound; phosphoric acid mono- or di-esters; esters of phosphoric acid and an epoxy-containing compound, etc.

It is suitable to use about 0.01 to about 10 parts by weight of the curing catalyst per 100 parts by weight of the combined amount of the two components (A) and (B) calculated as solids.

Although the crosslinking curing reaction mechanism of the curable composition of the invention still remains to be fully clarified, it is thought that the noncyclic acid anhydride group in the component (B) undergoes an addition reaction with the epoxy group in the component (A) on heating or in the presence of the catalyst, or with the hydroxyl group in the component (A) to form a carboxyl group, which undergoes an addition reaction with the epoxy group, whereby the composition is crosslinked three-dimensionally for curing. The composition thus cured is excellent in solvent resistance, resistance to chemicals, weather resistance, water resistance, flexibility, etc.

BEST MODE OF CARRYING OUT THE INVENTION

The present invention will be described in greater detail with reference to the following preparation examples, examples and comparative examples.

Preparation of Components (A)

Preparation 1

(A-1): Epoxy- and hydroxyl-containing resin

An acrylic resin solution containing 50 wt. % of solids (solvent: xylol) was prepared from 1 mole of glycidyl methacrylate, 1 mole of 2-hydroxyethyl acrylate and 5.2 moles of n-butyl methacrylate. The acrylic resin was about 20000 in number average molecular weight and contained about 20 epoxy groups per molecule and about 20 hydroxyl groups per molecule.

Preparation Example 2

(A-2): Epoxy- and hydroxyl-containing resin

A resin solution containing 50 wt. % of solids was prepared by dissolving Epikote #1001 (brand name, hydroxyl-containing epoxy resin manufactured by Shell Chemical Co., Ltd. and having a number average molecular weight of about 900) in butyl acetate. The resin contained about 2 epoxy groups per molecule and about 2 hydroxyl groups per molecule.

Preparation Example 3

(A-3): Epoxy- and hydroxyl-containing resin

A resin solution having a concentration of 50 wt. % was prepared by dissolving an epoxidized polybutadiene (about 3500 in number average molecular weight) having terminal hydroxyl in xylol. The resin contained about 6 epoxy groups per molecule and about 2 hydroxyl groups per molecule.

Preparation Example 4

(A-4): Epoxy-containing resin

Epikote #828 (brand name, product of Shell Chemical Co., Ltd.) was used which was a liquid epoxy resin having a number average molecular weight of about 350 and containing 100 wt. % of solids and about 2 epoxy groups per molecule.

Preparation Example 5

(A-5): Epoxy-containing resin

An acrylic resin solution containing 50 wt. % of solids (solvent: xylol) was prepared from 2 moles of 3,4-epoxycyclohexylmethyl methacrylate and 4.2 moles of n-butyl methacrylate. The acrylic resin was about 6000 in number average molecular weight and contained about 12 epoxy groups in the molecule.

Preparation Example 6

(A-6): Epoxy-containing resin

An acrylic resin solution containing 50 wt. % of solids was prepared by reacting monomers, i.e., 2 moles of glycidyl methacrylate and 5 moles of n-butyl methacrylate, in xylol for radical polymerization. The acrylic resin was about 20000 in number average molecular weight and contained about 40 epoxy groups in the molecule.

Preparation Example 7

(A-7): Hydroxyl-containing resin

An acrylic resin solution containing 50 wt. % of solids (solvent: xylol) was prepared from 2 moles of 2-hydroxyethyl acrylate and 5.4 moles of n-butyl methacrylate. The acrylic resin was about 6000 in number average molecular weight and contained about 12 hydroxyl groups in the molecule.

Preparation of Components (B)

EXAMPLE 1

(B-1): Compound of the formula (I) wherein R is a monovalent hydrocarbon group with 6 carbon atoms and R' is a bivalent hydrocarbon group with 4 carbon atoms, with about 6 noncyclic acid anhydride groups present in the molecule A crosslinking agent (B-1) was prepared by mixing together 5 moles of adipic acid, 2 moles of benzoic acid and 10 moles of acetic anhydride, reacting the monomers at 140° C. while removing acetic acid as a by-product, heating the mixture to 160° C. when acetic acid ceased flowing out and removing an excess of acetic anhydride to terminate the reaction. The agent was P in Gardner viscosity (20° C.) and about 400 in number average molecular weight as determined by GPC (gel permeation chromatography).

EXAMPLE 2

(B-2): Compound of the formula (I) wherein R is a monovalent hydrocarbon group with 6 carbon atoms and R' is a bivalent hydrocarbon group with 7 or 4 carbon atoms, with about 20 noncyclic acid anhydride groups present in the molecule Azelaic acid chloride (9 moles), 10 moles of ammonium adipate and 2 moles of benzoic acid chloride were mixed together, and the mixture was reacted at a temperature of up to 20° C. for 1 hour. Ammonium chloride formed as a by-product was removed to obtain a crosslinking agent (B-2). The agent was Z1 in Gardner viscosity and about 1400 in number average molecular weight as determined by GPC.

EXAMPLE 3

(B-3): Compound of the formula (I) wherein R is a monovalent hydrocarbon group with 6 carbon atoms and R' is a bivalent hydrocarbon group containing an ether linkage and having 4 carbon atoms, with about 21 noncyclic acid anhydride groups present in the molecule A crosslinking agent (B-3) was prepared by mixing together 20 moles of a compound represented by the formula HOOC—$CH_2CH_2$—O—$CH_2CH_2$—COOH, 2 moles of benzoic acid and 40 moles of acetic anhydride, reacting the mixture at 140° C. while removing acetic acid as a by-product, heating the mixture to 160° C. when acetic acid ceased flowing out and removing an excess of acetic anhydride to terminate the reaction. The agent was Z in Gardner viscosity (20° C.) and about 1400 in number average molecular weight as determined by GPC.

EXAMPLE 4

(B-4): Compound of the formula (I) wherein R is a monovalent hydrocarbon group with 8 carbon atoms and R' is a bivalent hydrocarbon group containing a urethane linkage and having 22 carbon atoms, with about 11 noncyclic acid anhydride groups present in the molecule A crosslinking agent (B-4) was prepared by mixing together 10 moles of a compound represented by the formula

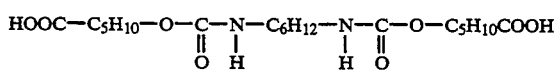

2 moles of isononanoic acid and 20 moles of acetic anhydride, heating the mixture at 140° C while removing acetic acid as a by-product, heating the mixture to 160° C. when acetic acid ceased flowing out and removing an excess of acetic anhydride to terminate the reaction. The agent was in the form of a white solid. When the product was made into a solution containing about 90 wt. % of solids with methyl isobutyl ketone, the solution was Z3 in Gardner viscosity (20° C.) and about 2500 in number average molecular weight as determined by GPC.

EXAMPLE 5

(B-5): Compound of the formula (I) wherein R is a monovalent hydrocarbon group with 18 carbon atoms and R' is a bivalent hydrocarbon group with 4 carbon atoms, with about 11 noncyclic acid anhydride groups present in the molecule Ten moles of adipic acid was heated to 400° C., and water flowing out was removed, whereupon 2 moles of dehydrated castor oil fatty acid was added to the reaction mixture, followed by a further reaction at 200° C. for 4 hours to obtain a crosslinking agent (B-5). The agent was N in Gardner viscosity (20° C.) and about 2000 in number average molecular weight as determined by GPC.

EXAMPLE 6

(B-6): Compound of the formula (I) wherein R is a monovalent hydrocarbon group with 6 carbon atoms and R' is a bivalent hydrocarbon group containing an ester linkage and having 40 carbon atoms, with about 2 noncyclic acid anhydride groups present in the molecule A crosslinking agent (B-6) was obtained by preparing a linear polyester resin (about 960 in number average molecular weight) having terminal carboxyl and comprising 5 moles of adipic acid and 4 moles of neopentyl glycol, mixing 2 moles of benzoic acid and 3 moles of acetic anhydride with the resin, reacting the mixture at 140° C. while removing acetic acid as a by-product, heating the mixture to 160° C. when acetic acid ceased flowing out and removing an excess of acetic anhydride to terminate the reaction. The agent was K in Gardner viscosity (20° C.) and about 350 in number average molecular weight as determined by GPC.

EXAMPLE 7

(B-7): Compound of the formula (I) wherein R is a monovalent hydrocarbon group with 8 carbon atoms and R' is a bivalent hydrocarbon group containing an ester linkage and having 42 carbon atoms, with about 6 noncyclic acid anhydride groups present in the molecule A crosslinking agent (B-7) was obtained by preparing a linear polyester resin having terminal carboxyl and comprising 20 moles of phthalic anhydride and 15 moles of 1,6-hexanediol, mixing 2 moles of isononanoic acid and 10 moles of acetic anhydride with the resin and reacting the mixture in the same manner as in preparing the agent (B-6). The agent was Z in Gardner viscosity and about 2000 in number average molecular weight as determined by GPC.

EXAMPLE 8

(B-8): Compound of the formula (I) wherein R is a monovalent hydrocarbon group with 12 carbon atoms and R' is a bivalent hydrocarbon group containing an ester linkage and having 40 carbon atoms, with about 11 noncyclic acid anhydride groups in the molecule A crosslinking agent (B-8) was obtained by mixing 2 moles of coconut oil fatty acid and 15 moles of acetic anhydride with 10 moles of a linear polyester having a molecular weight of 1000 and terminal carboxyl and prepared by reacting ε-caprolactone with lactic acid, and reacting the mixture in the same manner as in preparing the agent (B-6). The agent was S in Gardner viscosity and about 3000 in number average molecular weight as determined by GPC.

Preparation of curable compositions wherein the component (A) is a resin (i) having at least one epoxy group and at least one hydroxyl group in the molecule or a resin mixture (ii) of a resin (ii-1) having at least two epoxy groups in the molecule and a resin (ii-2) having at least two hydroxyl groups in the molecule, and the component has no ester linkage in the hydrocarbon groups represented by R and R' of the formula (I)

EXAMPLES 9-20

Curable compositions were each prepared from specified components obtained in Preparation Examples by mixing the components together in the proportions listed in Table 1 below and adjusting the mixture to a solids content of about 30 wt. % with an organic solvent (xylol/methyl isobutyl ketone =1/1 in weight ratio).

TABLE 1

| Example | Resin (i) Kind | Resin (i) Amount | Resin (ii-1) Kind | Resin (ii-1) Amount | Resin (ii-2) Kind | Resin (ii-2) Amount | Component (B) Kind | Component (B) Amount | Curing catalyst Kind | Curing catalyst Amount |
|---|---|---|---|---|---|---|---|---|---|---|
| 9 | (A-1) | 100 | | | | | (B-1) | 5 | (C-1) | 1 |
| 10 | (A-1) | 100 | | | | | (B-1) | 100 | | |
| 11 | (A-1) | 100 | | | | | (B-2) | 10 | (C-3) | 1 |
| 12 | (A-1) | 100 | | | | | (B-2) | 50 | (C-1) | 2 |
| 13 | (A-2) | 100 | | | | | (B-3) | 5 | (C-2) | 1 |
| 14 | (A-2) | 100 | | | | | (B-3) | 20 | (C-3) | 1 |
| 15 | (A-2) | 100 | | | | | (B-4) | 10 | (C-1) | 1 |
| 16 | (A-2) | 100 | | | | | (B-4) | 100 | | |
| 17 | (A-3) | 100 | | | | | (B-5) | 5 | (C-3) | 1 |
| 18 | (A-3) | 100 | | | | | (B-5) | 100 | (C-1) | 2 |
| 19 | | | (A-4) | 100 | (A-7) | 50 | (B-1) | 30 | (C-1) | 2 |
| 20 | | | (A-5) | 100 | (A-7) | 100 | (B-2) | 100 | (C-1) | 1 |

In Table 1,

1) The amounts of components are all those calculated as solids and expressed in parts by weight.

2) The symbols for the catalysts stand for the following.

(C-1): tetramethylammonium chloride
(C-2): tributylamine
(C-3): benzyltriphenylphosphonium chloride

Comparative Example 1

A curable composition comprising a mixture of 100 parts by weight of the component (A-1) and 10 parts by weight of azelaic acid, and 1 part by weight of tetramethylammonium chloride admixed with the mixture.

Property Tests

The curable compositions of Examples 9 to 20 and Comparative Example 1 were each stored in a closed container at 40° C. for 1 month and checked for the resulting state to determine the storage stability of the composition.

The compositions were each applied to a glass plate to a thickness, as cured, of 50 μm. For curing, the coatings of Examples 9, 11, 13, 14, 19 and 20 and Comparative Example 1 were heated at 140° C. for 30 minutes, those of Examples 15 and 18 were allowed to stand at room temperature for 7 days, those of Examples 10 and 16 were heated at 180° C. for 30 minutes, and those of Examples 12 and 17 were heated at 230° C. for 1 minute.

The cured coatings were subjected to following property test.

Gel fraction ratio:

The cured coating obtained as above was placed into a container of stainless steel net (300 mesh) and subjected to extraction at the reflux temperature for 2 hours using a Soxhlet extractor and acetone solvent. The ratio (wt. %) of the amount of coating remaining after the extraction to the amount of coating before the extraction was thereafter calculated.

Table 2 shows the results of property tests of the compositions and the coatings.

TABLE 2

|  | Gel fraction ratio | Storage stability |
| --- | --- | --- |
| Example 9 | 96.2 | No change |
| Example 10 | 95.7 | No change |
| Example 11 | 95.9 | No change |
| Example 12 | 96.6 | No change |
| Example 13 | 97.6 | No change |
| Example 14 | 96.1 | No change |
| Example 15 | 97.3 | No change |
| Example 16 | 95.9 | No change |
| Example 17 | 96.1 | No change |
| Example 18 | 96.2 | No change |
| Example 19 | 95.2 | No change |
| Example 20 | 97.7 | No change |
| Comp. Ex. 1 | 96.1 | Gelation |

Preparation of curable compositions wherein the component (A) is a resin (i) having at least one epoxy group and at least one hydroxyl group in the molecule or a resin mixture (ii) of a resin (ii-1) having at least two epoxy groups in the molecule and a resin (ii-2) having at least two hydroxyl groups in the molecule, and the component (B) has an ester linkage in the hydrocarbon group represented by R or R' of the formula (I)

EXAMPLE 21–28

Curable compositions were each prepared from specified components obtained in Preparation Examples by mixing the components together in the proportions listed in Table 3 below and adjusting the mixture to a solids content of about 30 wt. % with an organic solvent (xylolmethyl isobutyl ketone =1/1 in weight ratio).

TABLE 3

| Example | Resin (i) Kind | Resin (i) Amount | Resin (ii-1) Kind | Resin (ii-1) Amount | Resin (ii-2) Kind | Resin (ii-2) Amount | Component (B) Kind | Component (B) Amount | Curing catalyst Kind | Curing catalyst Amount |
| --- | --- | --- | --- | --- | --- | --- | --- | --- | --- | --- |
| 21 | (A-1) | 100 | | | | | (B-6) | 5 | (C-1) | 1 |
| 22 | (A-1) | 100 | | | | | (B-6) | 100 | | |
| 23 | (A-1) | 100 | | | | | (B-7) | 10 | (C-3) | 1 |
| 24 | (A-1) | 100 | | | | | (B-7) | 50 | (C-1) | 2 |
| 25 | (A-2) | 100 | | | | | (B-8) | 5 | (C-2) | 1 |
| 26 | (A-2) | 100 | | | | | (B-8) | 20 | (C-3) | 1 |
| 27 | | | (A-4) | 100 | (A-7) | 50 | (B-6) | 30 | (C-1) | 2 |
| 28 | | | (A-5) | 100 | (A-7) | 100 | (B-7) | 100 | (C-1) | 1 |

In Table 3, the amounts of the components and the symbols for the curing catalysts each have the same meaning as in Table 1.

Comparative Example 2

A curable composition comprising a mixture of 100 parts by weight of the component (A-1) and 50 parts by weight of methylhexahydrophthalic anhydride, and 1 part by weight of tetramethylammonium chloride admixed with the mixture.

Property Tests

The curable compositions of Examples 21 to 28 and Comparative Examples 1 and 2 were checked for storage stability by the same method as described above.

The compositions were applied to glass plates to a thickness, as cured, of 50 μm. For curing, the coatings of Examples 21, 25, 26, 27 and 28 and Comparative Examples 1 and 2 were heated at 140° C. for 30 minutes, the coating of Example 23 was allowed to stand at room temperature for 7 days, and those of Examples 22 and 24 were heated at 180° C. for 30 minutes and at 230° C. for 1 minute, respectively.

The cured coatings were tested for properties by the following methods. Gel fraction ratio:

By the same method as above.

Elongation:

The cured coating obtained as above was tested for elongation (%) by a tensilon tester (20° C).

Table 4 shows the results of property tests of the compositions and the coatings.

TABLE 4

|  | Gel fraction ratio | Storage stability | Elongation |
| --- | --- | --- | --- |
| Example 21 | 98.7 | No change | 35 |
| Example 22 | 96.2 | No change | 65 |
| Example 23 | 96.4 | No change | 35 |
| Example 24 | 97.0 | No change | 48 |
| Example 25 | 98.1 | No change | 40 |
| Example 26 | 97.7 | No change | 40 |
| Example 27 | 98.8 | No change | 30 |
| Example 28 | 96.0 | No change | 100 |
| Comp. Ex. 1 | 96.1 | Gelation | 8 |
| Comp. Ex. 2 | 98.2 | Marked increase in viscosity | 10 |

Preparation of curable compositions wherein the component (A) is a resin (iii) having at least two epoxy groups in the molecule, and the component (B) has no ester linkage in the hydrocarbon groups represented by R and R' of the formula (I)

EXAMPLE 29-39

Curable compositions were each prepared from specified components obtained in Preparation Examples by mixing the components together in the proportions listed in Table 5 below and adjusting the mixture to a solids content of about 30 wt. % with an organic solvent (xylolmethyl isobutyl ketone=1/1 in weight ratio).

TABLE 5

| Example | Resin (iii) Kind | Amount | Component (B) Kind | Amount | Curing catalyst Kind | Amount |
|---|---|---|---|---|---|---|
| 29 | (A-6) | 100 | (B-1) | 5 | (C-1) | 1 |
| 30 | (A-6) | 100 | (B-1) | 20 | (C-1) | 1 |
| 31 | (A-6) | 100 | (B-1) | 20 | (C-2) | 1 |
| 32 | (A-6) | 100 | (B-1) | 20 | (C-3) | 1 |
| 33 | (A-6) | 100 | (B-1) | 100 | (C-1) | 1 |
| 34 | (A-6) | 100 | (B-2) | 20 | (C-1) | 1 |
| 35 | (A-6) | 100 | (B-3) | 20 | (C-1) | 1 |
| 36 | (A-6) | 100 | (B-4) | 20 | (C-1) | 1 |
| 37 | (A-6) | 100 | (B-5) | 20 | (C-1) | 1 |
| 38 | (A-5) | 100 | (B-1) | 20 | (C-1) | 1 |
| 39 | (A-4) | 100 | (B-1) | 20 | (C-1) | 1 |

In Table 5, the amounts of the components and the symbols for the curing catalysts each have the same meaning as in Table 1.

Comparative Example 3

A curable composition comprising a mixture of 100 parts by weight of the component (A-6) and 10 parts by weight of azelaic acid, and 1 part by weight of tetramethylammonium chloride admixed with the mixture.

Property Tests

The curable compositions of Examples 29 to 39 and Comparative Example 3 were checked for storage stability by the same method as stated above. Table 6 shows the results.

The compositions were each applied to a glass plate to a thickness, as cured, of 50 μm and heated at 140° C. for 30 minutes for curing.

The cured coating were subjected to the same property test as above. Table 6 shows the results.

TABLE 6

|  | Gel fraction ratio | Storage stability |
|---|---|---|
| Example 29 | 95.8 | No change |
| Example 30 | 98.6 | No change |
| Example 31 | 94.4 | No change |
| Example 32 | 98.8 | No change |
| Example 33 | 90.2 | No change |
| Example 34 | 97.7 | No change |
| Example 35 | 97.2 | No change |
| Example 36 | 95.0 | No change |
| Example 37 | 98.2 | No change |
| Example 38 | 98.8 | No change |
| Example 39 | 98.7 | No change |
| Comp. Ex. 3 | 96.1 | Gelation |

Preparation of curable compositions wherein the component (A) is a resin (iii) having at least two epoxy groups in the molecule, and the component (B) has an ester linkage in the hydrocarbon group represented by R or R' of the formula (I)

EXAMPLE 40-48

Curable compositions were each prepared from specified components obtained in Preparation Examples by mixing the components together in the proportions listed in Table 7 below and adjusting the mixture to a solids content of about 30 wt. % with an organic solvent (xylol/methyl isobutyl ketone=1/1 in weight ratio).

TABLE 7

| Example | Resin (iii) Kind | Amount | Component (B) Kind | Amount | Curing catalyst Kind | Amount |
|---|---|---|---|---|---|---|
| 40 | (A-6) | 100 | (B-6) | 5 | (C-1) | 1 |
| 41 | (A-6) | 100 | (B-6) | 20 | (C-1) | 1 |
| 42 | (A-6) | 100 | (B-6) | 20 | (C-2) | 1 |
| 43 | (A-6) | 100 | (B-6) | 20 | (C-3) | 1 |
| 44 | (A-6) | 100 | (B-6) | 100 | (C-1) | 1 |
| 45 | (A-6) | 100 | (B-7) | 20 | (C-1) | 1 |
| 46 | (A-6) | 100 | (B-8) | 20 | (C-1) | 1 |
| 47 | (A-5) | 100 | (B-6) | 20 | (C-1) | 1 |
| 48 | (A-4) | 100 | (B-6) | 20 | (C-1) | 1 |

In Table 7, the amounts of the components and the symbols for the curing catalysts each have the same meaning as in Table 1.

Property Tests

The curable compositions of Examples 40 to 48 were checked for storage stability in the same manner as above. Table 8 shows the results.

These compositions and the composition of Comparative Example 3 were applied to glass plates to a thickness, as cured, of 50 μm and heated at 140° C. for 30 minutes for curing.

The cured coatings were tested for properties in the same manner as above. Table 8 shows the results.

TABLE 8

|  | Gel fraction ratio | Storage stability | Elongation |
|---|---|---|---|
| Example 40 | 97.2 | No change | 12 |
| Example 41 | 98.4 | No change | 21 |
| Example 42 | 97.2 | No change | 22 |
| Example 43 | 96.6 | No change | 25 |
| Example 44 | 90.2 | No change | 66 |
| Example 45 | 98.2 | No change | 30 |
| Example 46 | 99.3 | No change | 14 |
| Example 47 | 96.8 | No change | 27 |
| Example 48 | 95.5 | No change | 10 |
| Comp. Ex. 3 | 96.1 | No change | 5 |

We claim:

1. A curable composition comprising:
(A) at least one resin selected from the group consisting of (i) a resin having at least one epoxy group and at least one hydroxyl group in the molecule, (ii) a resin mixture of a resin (ii-1) having at least two epoxy groups in the molecule and a resin (ii-2) having at least two hydroxyl groups in the molecule, and (iii) a resin having at least two epoxy groups in the molecule, and (B) a crosslinking agent having at least two noncyclic acid anhydride groups and represented by the following formula

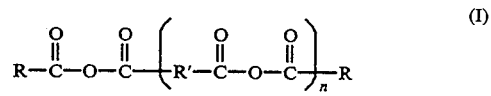

(I)

wherein R is a monovalent hydrocarbon group having 2 to 50 carbon atoms, R' is a bivalent hydrocarbon group having 2 to 50 carbon atoms, the hydrocarbon groups R and R' containing or not containing an ether linkage, urethane linkage or ester linkage, and n is an integer of 1 to 500.

2. A composition as defined in claim 1 wherein the resin (i) has 2 to 50 epoxy groups and 2 to 50 hydroxyl groups in the molecule.

3. A composition as defined in claim 1 wherein the resin (i) is about 300 to about 100000 in number average molecular weight, 4. A composition as defined in claim 1 wherein the resin (ii-1) has 2 to 50 epoxy groups in the molecule, 5. A composition as defined in claim 1 wherein the resin (ii-1) is about 300 to about 100000 in number average molecular weight.

6. A composition as defined in claim 1 wherein the resin (ii-2) has 2 to 50 hydroxyl groups in the molecule, 7. A composition as defined in claim 1 wherein the resin (ii-2) is about 300 to about 100000 in number average molecular weight, 8. A composition as defined in claim 1 wherein the resin (iii) has 2 to 50 epoxy groups in the molecule, 9. A composition as defined in claim 1 wherein the resin (iii) is about 300 to about 100000 in number average molecular weight.

10. A composition as defined in claim 1 wherein the ratio of the component (B) to the component (A) is about 1 to 1000 parts by weight of the component (B) per 100 parts by weight of the component (A).

11. A composition as defined in claim 1 wherein a curing catalyst is further added to the component (A) and the component (B).

* * * * *